United States Patent
Venkatesan et al.

(10) Patent No.: US 9,418,405 B2
(45) Date of Patent: Aug. 16, 2016

(54) METHOD AND SYSTEM FOR REDUCING MOTION BLURRING IN DIGITAL RADIOGRAPHY

(75) Inventors: Varun Akur Venkatesan, Bangalore (IN); Siraj Issani, Bangalore (IN); Chhaya Methani, Bangalore (IN); Vishal Prabhu, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/403,269

(22) PCT Filed: May 23, 2012

(86) PCT No.: PCT/EP2012/059578
§ 371 (c)(1),
(2), (4) Date: Dec. 12, 2014

(87) PCT Pub. No.: WO2013/174425
PCT Pub. Date: Nov. 28, 2013

(65) Prior Publication Data
US 2015/0110379 A1    Apr. 23, 2015

(51) Int. Cl.
*G06K 9/00* (2006.01)
*G06T 5/00* (2006.01)
(Continued)

(52) U.S. Cl.
CPC ............ *G06T 5/002* (2013.01); *G06K 9/481* (2013.01); *G06T 5/003* (2013.01); *G06T 2207/10116* (2013.01); *G06T 2207/20201* (2013.01)

(58) Field of Classification Search
CPC .................................. G06K 9/00; G06T 5/00
USPC ............. 382/128–134; 378/4, 8, 21–27, 101, 378/901, 21–2; 600/407, 410, 411, 425, 600/427
See application file for complete search history.

(56) References Cited

U.S. PATENT DOCUMENTS 7,187,749 B2 *   3/2007   Suzuki ................ A61B 6/0478
                                                              378/162
7,440,634 B2 *  10/2008   Ben-Ezra ............. G06T 7/2006
                                                              382/255

(Continued)

FOREIGN PATENT DOCUMENTS

DE         10318360 A1   11/2003
DE       102008026787 A1  12/2009
DE       102009057724 A1   6/2011

OTHER PUBLICATIONS

Ramesh Raskar et al,, "Coded Exposure Photography: Motion Deblurring using Fluttered Shutter", ACM Transactions on Graphics (TOG), vol. 25; No. 3, Jul. 1, 2006, pp. 795-804, XP002467982, ISSN: 0730-0301.

(Continued)

*Primary Examiner* — Abolfazl Tabatabai
(74) *Attorney, Agent, or Firm* — Laurence Greenberg; Werner Stemer; Ralph Locher

(57) ABSTRACT

A method of reducing motion blurring in digital radiography includes capturing at least one temporally coded blurred image of an object generated by using a coded pattern, and generating a de-blurred image from the at least one temporally coded blurred image by using the coded pattern and an estimate of a motion vector of the object. The at least one temporally coded blurred image is captured by using a total amount of generated light corresponding to at least a portion of radiation transmitted by the object. A digital radiography system is also provided.

14 Claims, 6 Drawing Sheets

(51) Int. Cl.
*G06K 9/48* (2006.01)
*B41M 5/00* (2006.01)

(56) References Cited

U.S. PATENT DOCUMENTS

| 7,486,772 | B2 * | 2/2009 | Lu | G01N 23/203 |
| | | | | 378/122 |
| 7,580,620 | B2 * | 8/2009 | Raskar | H04N 5/23248 |
| | | | | 348/208.99 |
| 2007/0025503 | A1 | 2/2007 | Hemmendorff | |
| 2010/0135455 | A1 | 6/2010 | Chiang | |

OTHER PUBLICATIONS

Skinner G. K., "X-Ray Imaging with Coded Masks", Scientific American Inc., New York, US, vol. 259, No. 2, Aug. 1, 1988, pp. 66-71; XP001526339; ISSN: 0036-8733.

Cao Guohua et al., "Temporal multiplexing radiography for dynamic x-ray imaging", Review of Scientific Instruments, AIP, Melville, NY, US; vol. 80; No. 9; Sep. 4, 2009, pp. 93902-93902, XP012128499, ISSN: 0034-6748; 2009; US; Sep. 4, 2009.

Scott McCloskey, "Temporally Coded Flash Illumination for Motion Deblurring", Computer Vision (ICCV), 2011 IEEE International Conference on, IEEE, Nov. 6, 2011, pp. 683-690, XP032101257 ISBN: 978-1-4577-1101-5.

Leah Bar et al., "A Variational Framework for Simultaneous Motion Estimation and Restoration of Motion-Blurred Video", pp. 1 to 8, 978-1-4244-1631-8/07/$25.00 © 2007 IEEE; 2007.

Sunghyun Cho et al., "Removing Non-Uniform Motion Blur from Images", pp. 1 to 8, 978-1-4244-1631-8/07/$25.00 © 2007 IEEE; 2007.

Shengyang Dai et al., "Motion from Blur" EECS Department, Northwestern University, Evanston, IL 60208, USA, pp. 1 to 8, 978-1-4244-2243-2/08/$25.00 © 2008 IEEE; 2008.

* cited by examiner

METHOD AND SYSTEM FOR REDUCING MOTION BLURRING IN DIGITAL RADIOGRAPHY

BACKGROUND OF THE INVENTION

Field of the Invention

The present invention relates to method and system for reducing motion blurring in digital radiography.

Digital radiography is an imaging technique and is used medical imaging for diagnostic and surgical purposes and in industrial applications for evaluating wear and tear of an article. Motion blurring is a pressing problem in digital radiography systems. For example, during surgical during surgical operations on infant patient subjects, often infants need to be held still which causes the operator's protective lead gloves to interfere with the diagnostic image quality. Similar problems arise during other diagnostic scenario in adults such as catheterization and swallow studies (where contrast media are orally administered, and are motion-tracked as it passes through the neck and the esophagus and studied for blockages).

Fluoroscopy is a medical imaging technique using digital radiography for obtaining video frames of the internal tissue structure of a patient for diagnostic and surgical purposes. It consists of an X-ray generator producing X-ray photons directed towards a fluorescent screen via an image intensifier. A patient between the X-ray generator and the image intensifier attenuates the X-ray beam differentially depending on the tissue density and type creating an impression of the tissue structure on the fluorescent screen. The image thus formed on the screen is typically captured by a digital camera and eventually displayed on a monitor as a live video for the physicians to perform a diagnosis or a surgical operation on the patient subject.

A video camera would typically require a certain minimum pixel integration time, during which an individual video frame is being grabbed. This time depends on several factors such as, lighting quality and quantity (characterized by X-ray generator voltage and current respectively), sensitivity of the camera, and aperture (larger aperture allows more light, but decreases peripheral focus within a frame).

Sensitivity and aperture are camera parameters, while lighting is X-ray generation specific. Better lighting would result in more dosage to the patient. While the camera integrates enough light generating one frame, if there is movement in the field of view (for example, due to patient movement, catheterization, heart beating), motion blur is observed in the resulting frame. Generally, the frame-rate requirement for a fluoroscopy video is around 30 fps. This typically means that the camera integration time would be around 33 ms and the lighting would be chosen to provide sufficient image quality for this integration time. Grid controlled pulsed fluoroscopy is one technique used for reducing motion blurring in fluoroscopy. However, the following drawbacks, such as, material cracking due to local overheating, reduced anode life due to thermal cycling and high temperature of the filament increases evaporation risks and tube arching.

The above mentioned drawbacks are mitigated by reducing the sampling rate, increasing the focal spot diameter and limiting the pulse width. Reducing the sampling rate reduces the temporal resolution of the images captured. Focal spot is the point at which the electrons are focused inside the X-ray generator. Since all of the heat is generated locally at the focal spot, increasing the area will increase the apparent heat capacity. This may result in loss of high spatial frequencies. Limiting the pulse width puts a restriction on the degree of be-blurring that can be achieved.

Similar problems are experienced with respect to industrial imaging. However, in case of industrial imaging, there is no strict requirement of keeping the dosage low. But, then increase in dosage may require additional hardware and thus, the cost of the system may be increased.

BRIEF SUMMARY OF THE INVENTION

The object of the invention is to provide a system and a method for reducing motion blurring in digital radiography without the requirement of increasing the radiation incident onto the object.

The object of the invention is achieved by a method of reducing motion blurring in digital radiography and a digital radiography system, wherein the method comprises, capturing at least one temporally coded blurred image of an object generated using a coded pattern, and generating at least one de-blurred image from the at least one temporally coded blurred image using the coded pattern and an estimate of a motion vector of the object, wherein the at least one temporally coded blurred image is captured using a total amount of light generated corresponding to at least a portion of a radiation transmitted by the object.

The generation of the de-blurred image from the temporally coded blurred image helps in reducing the motion blurs. The temporally coded blurred image of the object is captured using the total amount of light corresponding to the portion of radiation transmitted by the object. This achieves in preserving the intensity of the de-blurred image.

According to an embodiment, the motion vector is estimated using the at least one temporally coded blurred image, wherein a sum of intensity of the at least one temporally coded blurred image corresponds to an intensity of the total amount of light. This achieves in estimating the motion vector with increased accuracy as the motion vector is estimated using the total intensity of the light.

According to another embodiment, the at least one temporally coded blurred image is generated by directing the light corresponding to the radiation transmitted by the object onto a plurality of cameras responsive to the coded pattern. This achieves in capturing the total light corresponding to the radiation transmitted by the object.

According to yet another embodiment, wherein the de-blurred image is generated using a plurality of said temporally coded blurred images. This achieves in generating the de-blurred image by preserving the intensity.

According to yet another embodiment, the at least one temporally coded blurred image is generated by controlling the radiation generated by an X-ray generator responsive to the coded pattern. The X-ray generator is controlled to generate the radiation responsive to the coded pattern. Thus, the radiation generated is not continuous and this assists in having the light corresponding to the radiation transmitted by the object incident on the camera in a discontinuous manner.

According to yet another embodiment, wherein the controlling of the radiation generated includes controlling a voltage of an electrode between a cathode and an anode of the X-ray generator responsive to the coded pattern. The electrode can be switched on and off by controlling the voltage. Switching the electrode on and off blocks and allows flow of electrons from the cathode to the anode of the X-ray generator respectively.

According to yet another embodiment, the generation of the at least one temporally coded blurred image includes controlling a current supplied to the X-ray generator responsive to the coded pattern. Controlling the current supplied to the X-ray generator responsive to the coded pattern achieves in increasing the radiation generated such that it is equal to the radiation generated without deploying the electrode. For example, the radiation can be increased and as the radiation generated is discontinuous, the radiation incident onto the object over a period of time would be equal to the radiation which was required to be incident onto the object in case the electrode was not deployed. This achieves in marinating the radiation and also preserving the intensity of the de-blurred image generated.

Another embodiment includes a digital radiography system, comprising an imaging module configured to capture at least one temporally coded blurred image of an object generated using a coded pattern, and a processing module configured to generate at a de-blurred image from the at least one temporally coded blurred image using the coded pattern and an estimate of motion of the object, wherein the at least one temporally coded blurred image is captured using a total amount of light generated corresponding to at least a portion of a radiation transmitted by the object.

According to an embodiment, the processing module is configured to estimate the motion vector using the at least one temporally coded blurred image, wherein a sum of intensity of the at least one temporally coded blurred image corresponds to an intensity of the total amount of light.

According to another embodiment, the imaging module comprises a plurality of cameras to capture a plurality of said temporally coded blurred images.

According to yet another embodiment, the system further comprises a digital micromirror device comprising a plurality of mirrors configurable to selectively toggle on and off responsive to the coded pattern for directing the light corresponding to the radiation transmitted by the object onto the plurality of cameras.

According to yet another embodiment, the processing module is configured to generate the de-blurred image using the plurality of said temporally coded blurred images.

According to yet another embodiment, the system further comprises a controller operably coupled to an X-ray generator, the controller configured to control the radiation generated by the X-ray generator responsive to the coded pattern for generating the at least one coded blurred image.

According to yet another embodiment, the controller is configured to control a voltage of an electrode between a cathode and an anode of the X-ray generator responsive to the coded pattern.

According to yet another embodiment, the controller is configured to control a current supplied to the X-ray generator responsive to the coded pattern.

BRIEF DESCRIPTION OF THE SEVERAL VIEWS OF THE DRAWING

The present invention is further described hereinafter with reference to illustrated embodiments shown in the accompanying drawings, in which.

DESCRIPTION OF THE INVENTION

Figure 1:
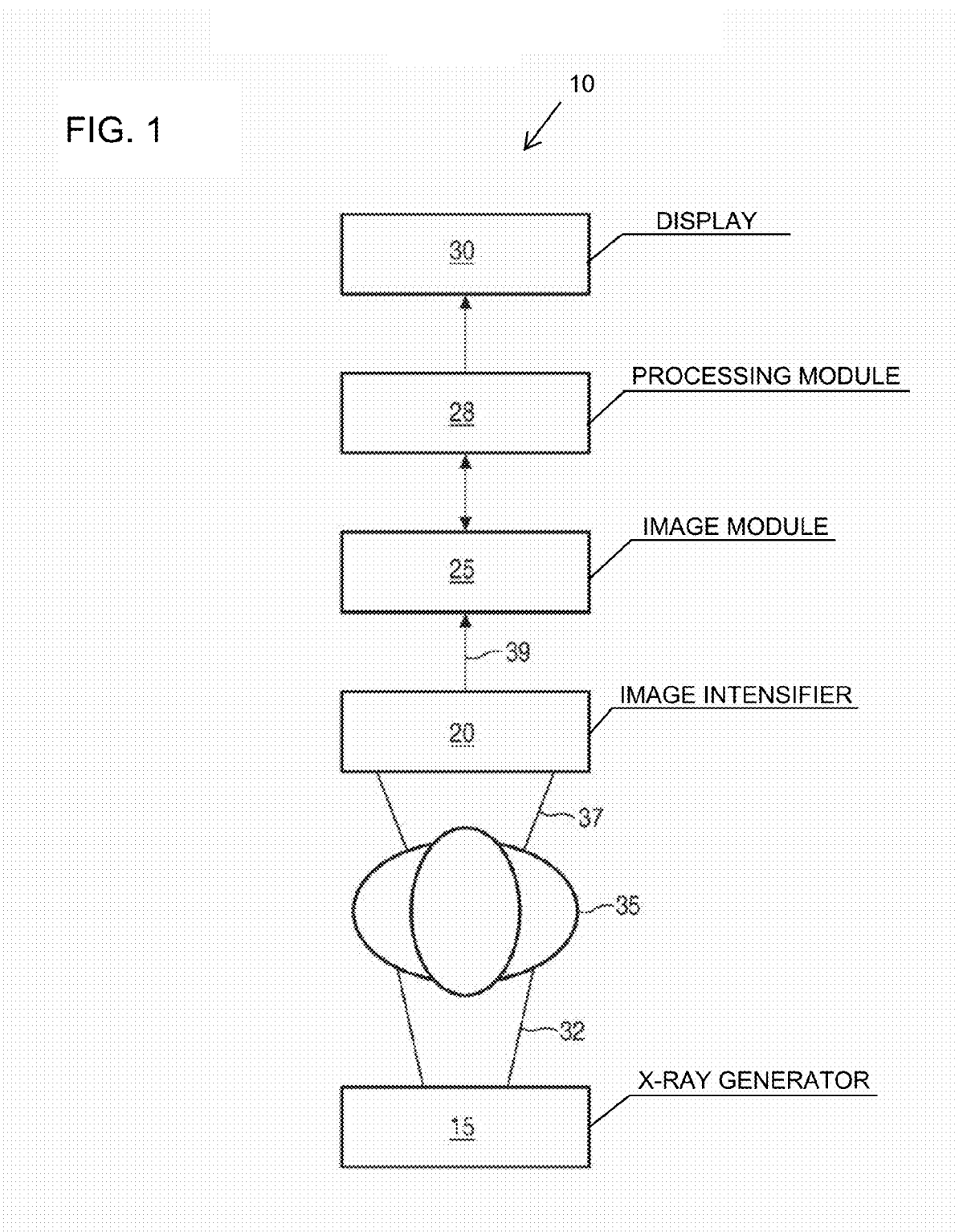
FIG. 1 illustrates an exemplary block diagram of a digital radiography system according to an embodiment herein.

FIG. 1 illustrates an exemplary block diagram of a digital radiography system 10 according to an embodiment herein. The digital radiography system 10 comprises an X-ray generator 15, an image intensifier 20, an imaging module 25, a processing module 28 and a display 30. The X-ray generator 15 is configured to generate a radiation 32 for imaging an object 35. The object 35 is positioned between the X-ray generator 15 and the image intensifier 20. The object 35 can be a patient in case the digital radiography system 10 is used for medical imaging or can be an article in aspects where the digital radiography system 10 is used for evaluating an article.

Referring still to FIG. 1, the at least a portion of the radiation 37 transmitted by the object 35 is received by the image intensifier 20. The term transmitted used herein refers to radiation transmitted by an object and includes, radiation transmitted through the object 35 in cases of medical imaging, radiation back scattered by the object 35 in cases of screening the object 35 for security proposes. For example, back scattering of the radiation occurs in screening of passengers at airports. Thus, the image intensifier 20 will receive at least a portion of the radiation 37 as required for a specific imaging application. The image intensifier 20 is configured to convert the received radiation 37 to light 39 and output the same. The imaging module 25 is adapted to image the light 39 outputted by the image intensifier 20 and capture the light 39 as an image of the object 35. The light 39 outputted by the image intensifier 20 corresponds to the portion of the radiation 37 transmitted by the object 35 and received by the image intensifier 20. According to an aspect, the total amount of light 39 outputted by the image intensifier 20 is captured by the imaging module 25 without any wastage.

Figure 7:
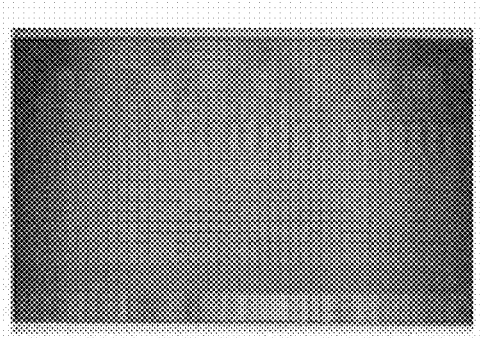
FIG. 7 illustrates an example of a temporally coded blurred image.

Referring still to FIG. 1, according to an aspect herein, the image of the object 35 captured by the imaging module 25 is a temporally coded blurred image (shown as 95 in FIG. 7). This is achieved by temporally modulating the image being captured by the imaging device 25 using a coded pattern. The image can be temporally modulated by modulating the radiation generated by the X-ray generator 15 or by modulating the light 39. The light 39 outputted by the image intensifier 20 is captured by the imaging module 25 responsive to the coded pattern. Thus, the light 39 outputted by the image intensifier 20 is not captured by the imaging module 25 in a continuous manner. This means that the light 39 from the image intensifier 20 is captured by the imaging module 25 over a given period of time, but is not captured at several predetermined intervals. The light 39 not being captured by the imaging module 25 in a continuous manner enables the imaging module 25 to capture the temporally coded blurred image of the object 35. This achieves in preserving the spatial and temporal frequencies.

Referring still to FIG. 1, the processing module 28 is operably coupled to the imaging module 25 and receives the temporally coded blurred image captured by the imaging module 25. The processing module 28 is configured to generate a de-blurred image (shown as 100 in FIG. 8) from the temporally coded blurred image by mapping points of the scene in both time and space captured by the imaging module 26 to different pixels in different combinations. The intensity of the de-blurred image generated is preserved as the total amount of light 39 corresponding to the radiation 37 transmitted by the object 35 is captured. For example, in an aspect, the processing module 28 can be configured to map the points of the scene in both time and space captured by the imaging module 25 to different pixels in different combinations by using the coded pattern and the motion vector of the object 35. Accordingly, the processing module 28 can be configured to generate the de-blurred image from the temporally coded blurred image using a reconstruction algorithm. The reconstruction algorithm can be stored at a memory internal to the processing module 28 or at a memory external to the processing module 28. In case the memory is external to the processing module 28, the memory can be operably coupled to the processing module 28. The display 30 is operably coupled to the processing module 28 and is configured to display the de-blurred image of the object 35. For example, the display can be a monitor for displaying the de-blurred image.

Referring still to FIG. 1, according to an aspect, the processing module 28 can be configured to estimate the motion vector from the temporally coded blurred image. According to another aspect, the processing module 28 can be configured to estimate the motion vector of the object using known geometric parameters of the object 35. The information of the geometric parameters of the object 35 can be stored at a memory internal or external to the processing module 28 and the processing module 28 can be configured to estimate the motion vector responsive to the geometric parameters. According to yet another embodiment, the processing module 28 can be configured to receive the estimate of the motion vector as an input. For example, an input device can be operably connected to the processing module and the estimate of the motion vector can be provided as an input by an operator using the input device. The estimation of the motion vector using the temporally coded blurred image achieve in estimating the motion vector with increased accuracy as the temporally coded blurred image is captured using the total amount of light 39 outputted by the image intensifier 20.

The process of generating the de-blurred image from the temporal coded blurred image using the reconstruction algorithm is explained below mathematically using a general mathematical equation as provided below:

$$y = Ax \quad (1)$$

where, x is a vector of the light 39 outputted by the image intensifier 15, and y is the vector of pixel values as seen by the imaging module 20 and A is the correspondence operator that maps different regions of x to y in different times. In the present example a 2×2 image will be represented as a 4×1 vector.

For a moving scene, it can be said that that mapping in different times would imply mapping of different pixels to different locations.

For example for a 2×2 image without blur (exposed for time 't'), the matrix A could be constructed as, $$A = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (2)$$

With the blur of one pixel (exposed for time '2t'), the matrix A could be constructed as, $$A = \begin{pmatrix} 1 & 1 & 0 & 0 \\ 0 & 1 & 1 & 0 \\ 0 & 0 & 1 & 1 \\ 0 & 0 & 0 & 1 \end{pmatrix} \quad (3)$$

With the blur of two pixel (exposed for time '3t'), the matrix A could be constructed as, $$A = \begin{pmatrix} 1 & 1 & 1 & 0 \\ 0 & 1 & 1 & 1 \\ 0 & 0 & 1 & 1 \\ 0 & 0 & 0 & 1 \end{pmatrix} \quad (4)$$

Similarly, the matrix A for blur of more pixels can be constructed.

Assuming the light vector x=[4, 0, 2, 0], the pixel values y can be obtained as:

$$y = \begin{pmatrix} 4 \\ 2 \\ 2 \\ 0 \end{pmatrix} = \begin{pmatrix} 1 & 1 & 0 & 0 \\ 0 & 1 & 1 & 0 \\ 0 & 0 & 1 & 1 \\ 0 & 0 & 0 & 1 \end{pmatrix} \times \begin{pmatrix} 4 \\ 0 \\ 2 \\ 0 \end{pmatrix} \quad (4)$$

From equation (4), it can be seen that y is the vertically blurred output of the incident light onto the imaging module 25.

This equation y=Ax must be solved and mathematical theory says that this is possible if A has a high condition number. For a regular camera configuration in the context of moving objects, A is known to have a low condition number.

Using the coded radiation scheme, A can be made to have a higher condition number and this allows us to reconstruct the image at high quality in the context of blur.

In the examples seen above, for a radiation of '3t', the A matrix has a low condition number. If the radiation coding pattern was ON, OFF, ON at time intervals (0–t), (t–2t) and (2t–3t) respectively, the A matrix can be constructed as:

$$A = \begin{pmatrix} 1 & 0 & 1 & 0 \\ 0 & 1 & 0 & 1 \\ 0 & 0 & 1 & 0 \\ 0 & 0 & 0 & 1 \end{pmatrix} \quad (5)$$

It can be seen that the matrix A of equation (5) has a higher condition number than the matrix A of equation (6) and thus allows for effective de-blurring.

$$A = \begin{pmatrix} 1 & 1 & 1 & 0 \\ 0 & 1 & 1 & 1 \\ 0 & 0 & 1 & 1 \\ 0 & 0 & 0 & 1 \end{pmatrix} \quad (6)$$

Referring still to FIG. 1, the light 39 outputted by the image intensifier 20 not being captured by the imaging module 25 in a continuous manner assists in conditioning the matrix A with higher condition number related to the image acquisition. Thus, the processing module 28 is configured to determine the matrix A using the motion vector of the object 35 and the coded pattern. The coded pattern can be generated by the processing module 28 or can be defined by a user or an operator.

Figure 2:
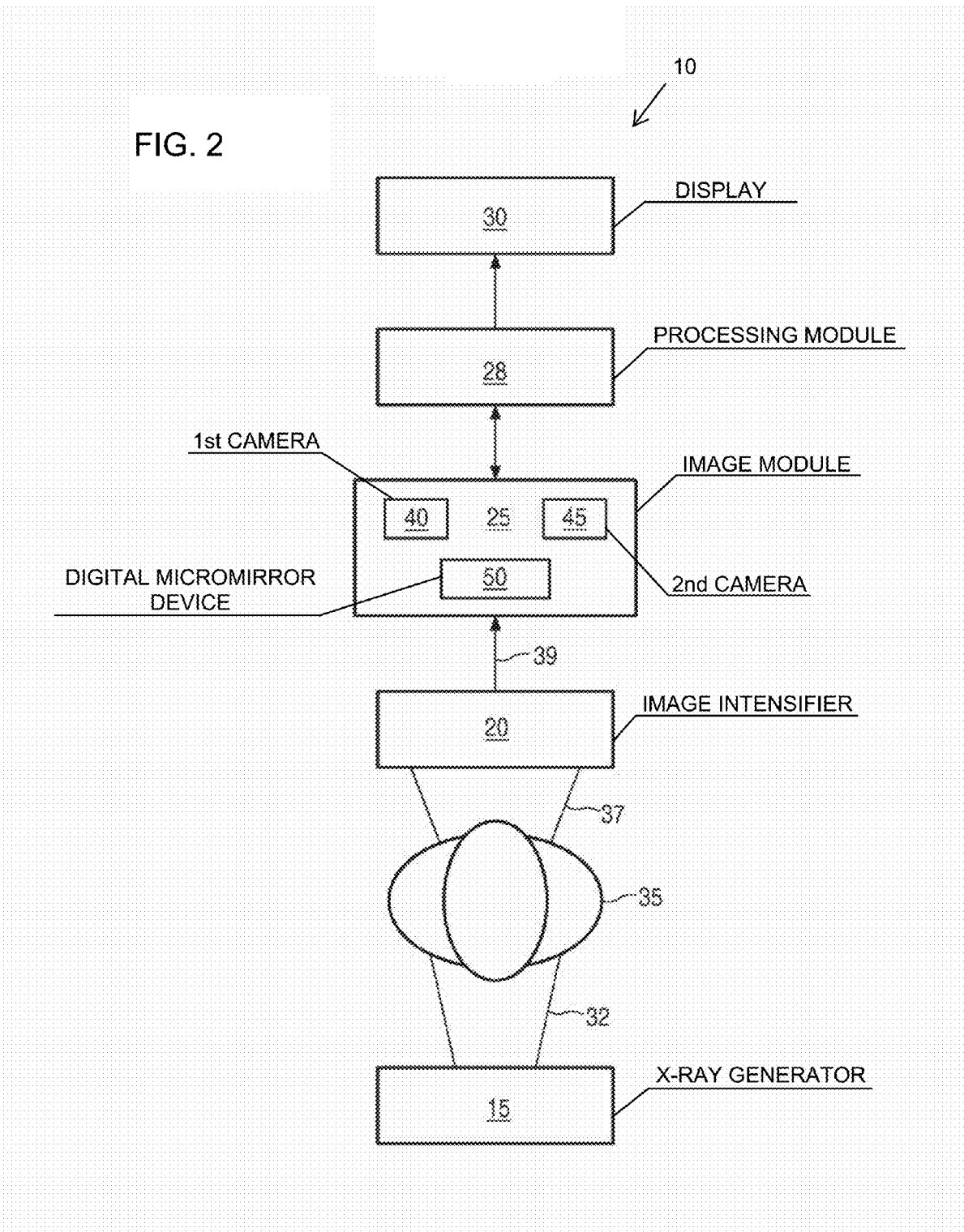
FIG. 2 illustrates an exemplary block diagram of a digital radiography system according to another embodiment herein.

FIG. 2 illustrates an exemplary block diagram of a digital radiography system 10 according to another embodiment herein. In the shown example of FIG. 2, the temporally coded blurred image is generated by modulating the light 39 outputted by the image intensifier 20. To achieve this, the imaging module 25 comprises a first camera 40, a second camera 45 and a digital micromirror device 50. The digital micromirror device 50 comprises a plurality of mirrors (shown as 55 in FIG. 3). Generally, the mirrors are arranged in a rectangular array. The mirrors are configurable and can selectively be toggled on and off responsive to an input command. According to an aspect herein, the digital micromirror device 50 is configured to direct the light 39 outputted by the image intensifier 20 onto the first camera 40 and the second camera 45 so that the cameras 40, 45 can capture the respective temporally coded blurred image. The mirrors of the digital micromirror device 50 are selectively toggled on and off responsive to the coded pattern for directing the light 39 outputted by the image intensifier 20 onto the first camera 50 and onto the second camera 45. Thus, the light 39 is not incident onto the first camera 40 and the second camera 45 in a continuous manner. The first camera 45 captures a first temporally coded blurred image and the second camera 45 captures a second temporally coded blurred image of the light 39 outputted by the image intensifier 20 responsive to the coded pattern.

For example, the mirrors can be toggled on to direct the light 39 onto the first camera 40 and the mirrors 55 can be toggled off to direct the light 39 onto the second camera 45. The directing of the light 39 onto the first camera 40 and the second camera 45 is explained in detailed in FIG. 3. The processing module 28 can be configured to control the selective on and off toggling of the mirrors 55 responsive to the coded pattern. The coded pattern can be stored at a memory internal to the processing module 28 or at a memory external to the processing module 28. In case the memory is external to the processing module 28, the memory can be operably connected to the processing module 28. In the present example, the processing module 28 is configured to generate a first preliminary de-blurred image using the first temporally coded blurred image and a second preliminary de-blurred image using the second temporally coded blurred image using the reconstruction algorithm discussed in FIG. 1. Subsequently, the processing module 28 is configured to generate a de-blurred image using the first preliminary de-blurred image and the second preliminary de-blurred image. For example, the de-blurred image can be generated by combining the first preliminary de-blurred image and the second preliminary de-blurred image. The first preliminary de-blurred image and the second preliminary de-blurred image can be combined by addition, weighted addition, and the like. The intensity of the de-blurred image of the object 35 obtained is preserved as the same is generated by combining the first preliminary de-blurred image and the second preliminary de-blurred image. Thus, the be-blurred image of the object 35 is obtained without wasting the light 39 outputted by the image intensifier 20. Thus, the intensity of the de-blurred image of the object 35 obtained is preserved without the requirement of increasing the radiation 32 generated by the X-ray generator 15. However, in another aspect, the processing module 28 can be configured to combine the first temporally coded blurred image and the second temporally coded blurred image to obtain a single temporally coded blurred image and generate the de-blurred image from the single temporally coded blurred image.

In case a shutter is used to control the incidence of the light 39 onto a camera of the imaging module 250, a portion of the light 39 is wasted when the shutter is closed and thus, the radiation 32 is required to be increased to obtain the de-blurred image with increased intensity. In case the digital radiography system 10 is used for medical imaging, for example, fluoroscopy, increased radiation is not desirable as the same may be harmful to the patient. Moreover, the cost of the system 10 increases if the radiation 32 is to be increased as additional hardware for increasing the radiation 32 is required to the deployed. Additionally, as the radiation 32 is not generated in the form of pluses, the amount of heat generated is reduced. Thus, wear and tear of the X-ray generator 15 is reduced.

Referring still to FIG. 2, according to an aspect, the accuracy of estimation of the motion vector is increased as the motion vector will be computed using the first temporally coded blurred image and the second temporally coded blurred image. The accuracy of estimation of the motion vector can be increased by estimating the motion vector as an average of the motion vectors obtained using the first temporally coded blurred image and the second temporally coded blurred. The sum of the intensities of the first temporally coded blurred image and the second temporally coded blurred image correspond to the intensity of the total amount of light 39. This enables in estimating the motion vector with increased accuracy.

In the shown example of FIG. 2, the imaging module 25 comprising two cameras 40, 45 is illustrated for example purposes only and the imaging module 25 can comprise a plurality of cameras to capture a plurality of respective temporally coded blurred images.

Figure 3:
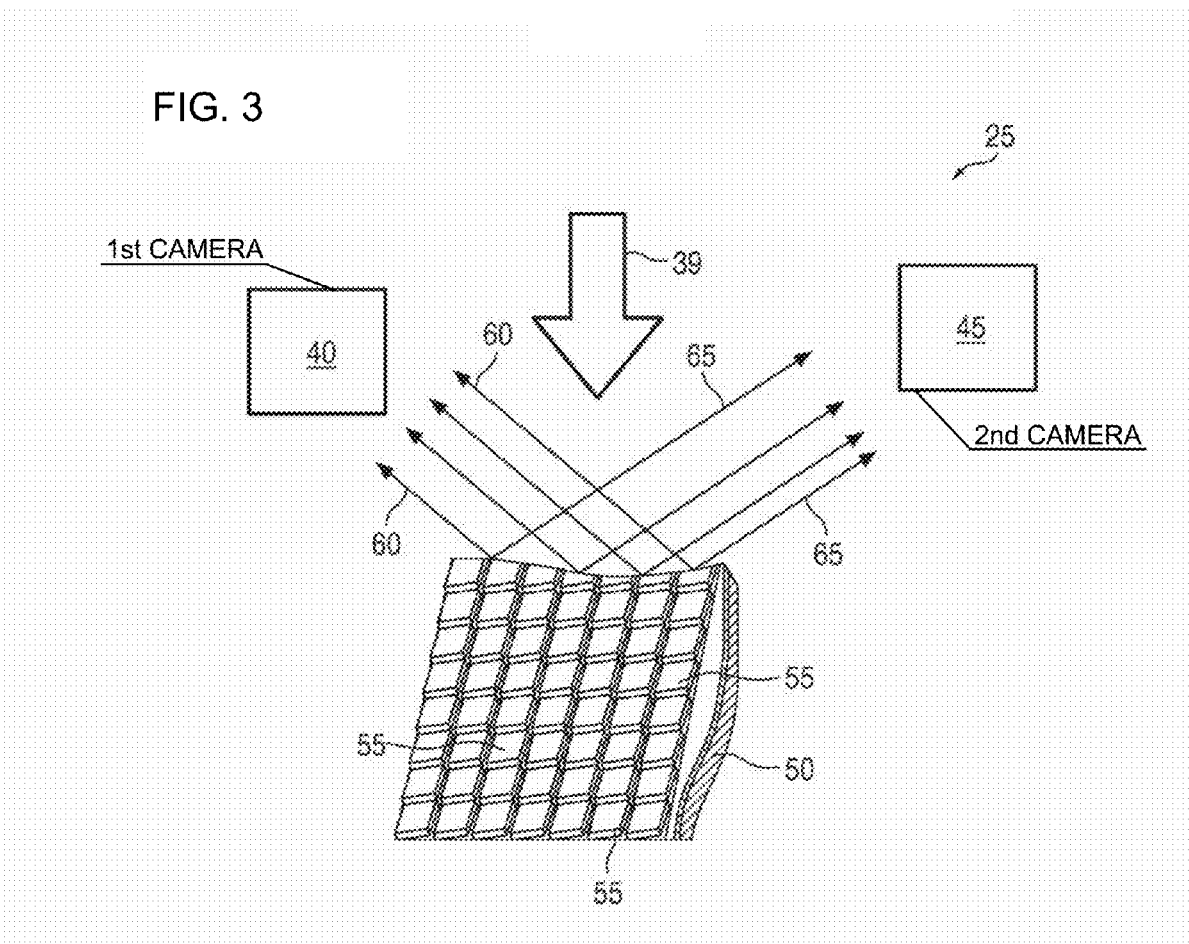
FIG. 3 illustrates an exemplary schematic diagram of an imaging system comprising a digital micromirror device, a first camera and a second camera according to an embodiment herein.

FIG. 3 illustrates an exemplary schematic diagram of an imaging system comprising a digital micromirror device, a first camera and a second camera according to an embodiment herein. The light 39 outputted by the image intensifier 20 of FIG. 2 is incident onto the digital micromirror device 50. The light 39 is directed to the first camera 40 when the mirrors 55 are toggled on. This is illustrated in FIG. 3 by the light path 60. The light 39 is directed to the second camera 45 when the mirrors 55 are toggled off. This is illustrated in FIG. 3 by the light path 65.

The de-blurred image obtained using the embodiments of FIG. 2 and FIG. 3 provides the advantage of reduced soft radiation exposure to the object. For example in case of medical imaging, it may be harmful to expose the patient to soft radiations. The embodiments of FIG. 3 and FIG. 4 enable in generating the de-blurred image while preserving the intensity and also without the requirement of increasing the radiation incident onto the object 35.

Figure 4:
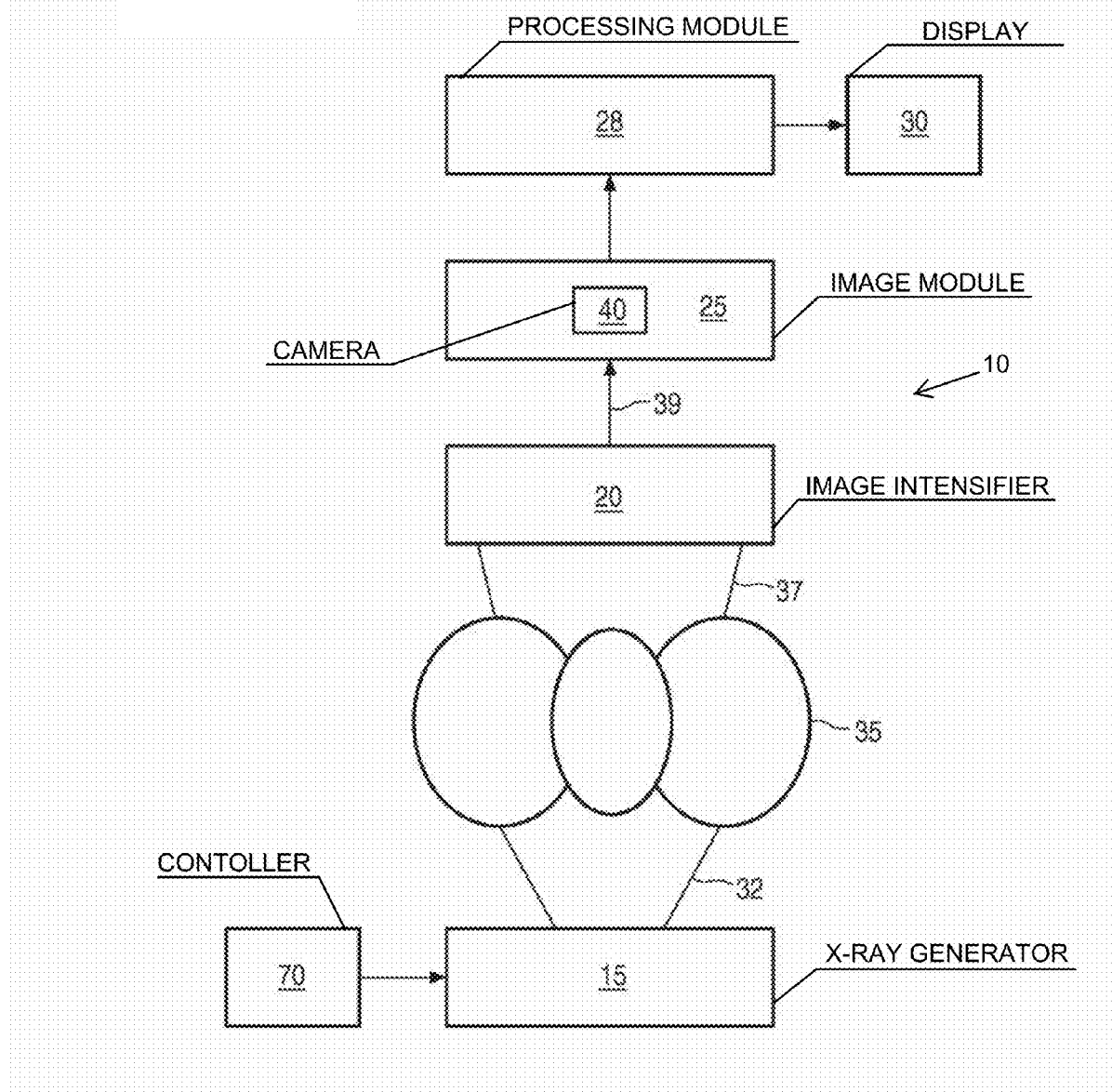
FIG. 4 illustrates an exemplary block diagram of a digital radiography system according to another embodiment herein.

FIG. 4 illustrates an exemplary block diagram of a digital radiography system 10 according to another embodiment herein. In accordance with the present embodiment, the light 39 is not incident in a continuous manner onto the imaging module 25 by generating the radiation 32 responsive to the coded pattern. Due to this the X-ray generator 15 will not generate the radiation in a continuous manner and correspondingly the light from the image intensifier 20 will not be incident onto the imaging module 25 in a continuous manner. According to an aspect, according to an aspect, to achieve this, an electrode (shown as 80 in FIG. 5) is positioned between a cathode (shown as 75 in FIG. 5) and an anode (shown as 85 in FIG. 5) of the X-ray generator 15 and the voltage of the electrode is controlled responsive to the coded pattern to generate the radiation 32. Generally, the electrode in between the cathode and the anode is called as grid. In the shown example of FIG. 4, a controller 70 is operably coupled to the X-ray generator 15 and the controller 70 controls the voltage of the electrode responsive to the coded pattern. The voltage of the electrode creates an electric field between the cathode and the anode and thus the flow of electrons from the cathode to the anode can be controlled. Advantageously, the voltage of the electrode can be controlled such that the electrode is switched on or off responsive to the coded pattern. When the electrode is switched on, no radiation 32 is generated as the flow of electrons from the cathode to the anode is blocked. When the electrode is switched off, the radiation 32 is generated as the flow of electrons from the cathode to the anode is not blocked. Thus, the radiation generated by the X-ray generator 15 is not continuous.

Referring still to FIG. 4, the radiation 37 transmitted by the object 35 is received by the image intensifier 20 and the image intensifier 25 outputs the light 39 corresponding to the radiation 37 transmitted by the object 35. In the present example of FIG. 4, the imaging module comprises a camera 40 for capturing a temporally coded blurred image of the light 37 outputted by the image intensifier 20. The imaging module 25 comprises only a single camera 40 in the present example as the radiation 32 generated by the x-ray generator 15 is already generated responsive to the coded pattern. As the radiation 32 is generated responsive to the coded pattern, the radiation 32 is not generated in a continuous manner and thus, the light 39 outputted by the image intensifier 20 is not incident onto the imaging module in a continuous manner. Thus, a single camera 40 can be used for capturing the temporally coded blurred image where the total amount of light 39 corresponding to the radiation 39 transmitted by the object 35 is captured by the camera 45. As the total amount of light 39 outputted by the image intensifier 20 is captured by the camera 40, the intensity of the de-blurred image generated is not reduced. The de-blurred image generated by the processing module 28 is provided to the display 30 for displaying the de-blurred image.

Referring still to FIG. 4, according to an aspect, the controller 30 can be configured to control a current supplied to the X-ray generator 15 for generating the radiation 32. Advantageously, the current is controlled responsive to the coded pattern. For example, as the radiation 32 is generated based on the coded pattern, the current can be increased such that the amount of radiation 32 incident on the object 35 is equal to the radiation that would have been incident onto the object 35 in case the radiation 32 was not generated responsive to the coded pattern. This achieves in preserving the intensity of the de-blurred image generated.

Referring still to FIG. 4, according to an aspect, as mentioned with respect to FIG. 2, the accuracy of estimation of the motion vector is increased as the motion vector will be computed using the temporally coded blurred image, wherein the intensity of the temporally coded blurred image corresponds to the intensity of the total amount of light 39.

Figure 5:
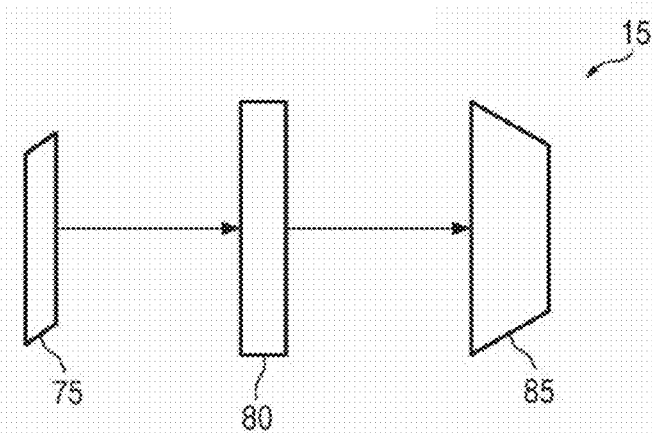
FIG. 5 illustrates a schematic block diagram of the X-ray generator comprising an electrode between a cathode and an anode according to an embodiment herein, FIG. 6 with illustrates an example of a coded pattern according to an embodiment herein.

FIG. 5 illustrates a schematic block diagram of the X-ray generator 15 comprising an electrode between a cathode and an anode according to an embodiment herein. The electrons generated at the cathode 75 are directed towards the anode 85. The electrode 80 is arranged in between the cathode 75 and the anode 85 and the voltage of the electrode 80 is controlled such that the electrode is switched on and off responsive to the coded pattern. Thus, when the electrode is switched on, the flow of electrons from the cathode 75 to the anode is blocked and when the electrode 85 is switched off the flow of electrons from the cathode 75 to the anode 85 is not blocked. This achieves in producing the radiation 37 in a in a discontinuous manner.

The embodiment described in FIG. 4 and FIG. 5 achieve in obtaining a de-blurred image of the object 45. As a single camera 40 is used for capturing the temporally coded blurred image, the techniques can be retrofitted easily with existing digital radiography systems. Moreover, as the current supplied to the X-ray generator 15 is controlled responsive to the coded pattern, the intensity of the de-blurred image is preserved. Furthermore, the exposure of the object 35 to soft radiations is reduced as the radiation 32 generated is controlled by switching the electrode 80. Additionally, the de-blurred image is generated using radiations 32 of lower intensity.

Figure 6:
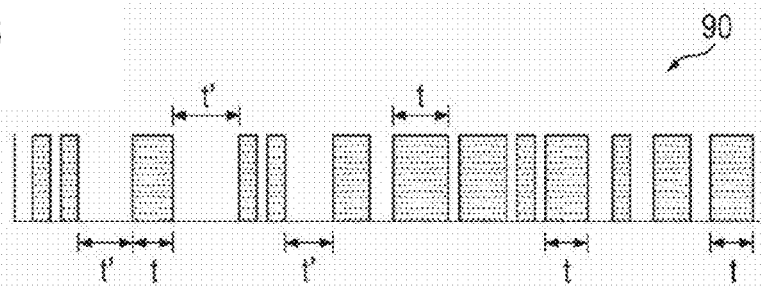

FIG. 6 illustrates an example of a coded pattern 90 according to an embodiment herein. With reference to FIG. 2 and FIG. 3, in the shown example of the coded pattern 90, for the interval t, the light 39 is incident onto the first camera 40 and for the interval t' the light is incident onto the second camera 45. With reference to FIG. 3 and FIG. 4, for the interval t, the electrode 85 is switched off to allow the flow of electrons from the cathode 75 to the anode 85 and for the interval t', the electrode 85 is switched on to block the flow of electrons from the cathode 75 to the anode 85. The intervals t and t' are not constant but comprise irregular intervals. Thus, the coded pattern 90 comprises a varying pulse interval. According to one aspect, the coded pattern 90 can be generated randomly. However, the coded pattern 90 can also be generated responsive to the motion of the object 35 of FIG. 1. The coded pattern can be generated and stored at a memory for subsequent usage.

Figure 8:
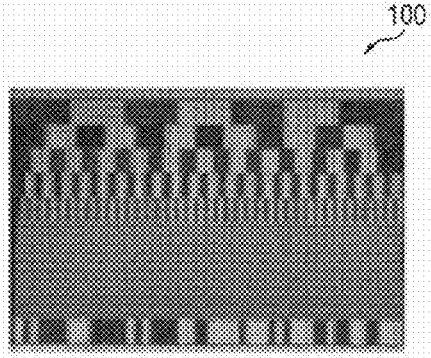
FIG. 8 illustrates an example of a de-blurred image.
Figure 9:
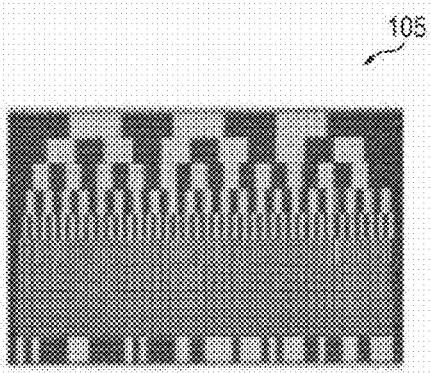
FIG. 9 illustrates an example of an actual image of an object.

FIG. 7 illustrates an example of a temporally coded blurred image 95. The temporally coded blurred image 95 is provided to the processing module 28 of FIG. 1 by the imaging module 25 of FIG. 1. The processing module 28 generates a de-blurred image using the temporally coded blurred image 95. FIG. 8 illustrates an example of a de-blurred image 100. FIG. 9 illustrates an example of an actual image 105 of the object 35 of FIG. 1. Referring now to FIG. 8 and FIG. 9, it can be seen that high spatial frequencies are preserved in the de-blurred image 100. This achieves in preserving the temporal and spatial frequencies in the de-blurred image.

Figure 10:
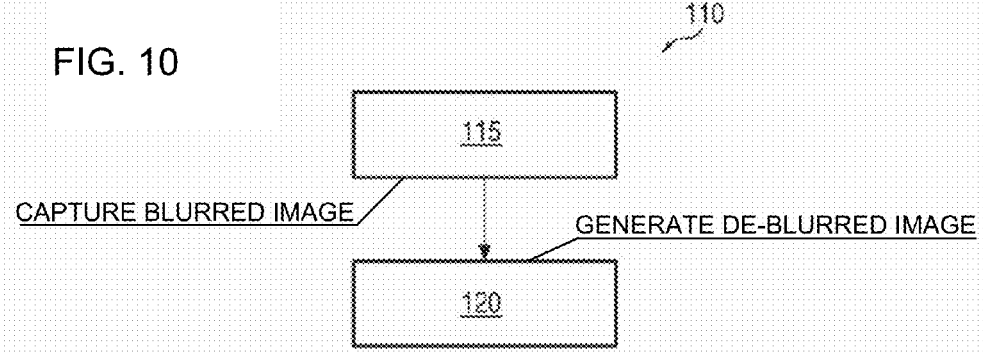
FIG. 10 is a flow diagram illustrating a method of reducing motion blurring in digital radiography according to an embodiment herein.

FIG. 10 with reference to FIG. 1 to FIG. 9 is a flow diagram illustrating a method 100 of reducing motion blurring in digital radiography according to an embodiment herein. At block 115, at least one temporally coded blurred image 95 of an object 35 generated using a coded pattern 90 is captured. Next, at block 120, at least one de-blurred image 100 is generated from the at least one temporally coded blurred image 95 using the coded pattern 90 and an estimate of a motion vector of the object 35, wherein a total radiation captured is equal to an radiation 39 transmitted by the object 35.

The embodiments described herein enable reducing motion blurring in a digital radiography system while preserving the intensity without the requirement of increasing the radiation incident onto the object. This is advantageous in medical imaging as the dosage is not required to be increased for imaging a patient for obtaining images with reduced blurs. Additionally, as the de-blurred image is obtained using relatively low intensity of the radiation, the requirement of additional hardware for generating high intensity radiation is not required. Thus, this achieves in reducing the cost of the system. Additionally, the wear and tear of the X-ray generator is reduced as the amount of heat generated is reduced. Moreover, the exposure of the object to soft radiations is also reduced. Additionally, the techniques describes herein can be retrofitted to an existing system. The embodiments can be used for fluoroscopy, evaluating an article in industrial imaging, screening of passengers at airports and the like.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves, to those of skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

LIST OF REFERENCE SIGNS

10 Digital radiography system
15 X-ray source
20 Image intensifier
25 Imaging module
28 Processing module
30 Display
32 Exposure
35 Object
37 Exposure transmitted by patient
39 Visible light
40 A first camera
45 A second camera
50 Digital micromirror device
55 Mirrors
60 Light path
65 Light path
70 Controller
75 Cathode
80 Electrode
85 Anode
90 Coded pattern
95 Temporally coded blurred image
100 De-blurred image
105 Actual image of the object

The invention claimed is:

1. A method of reducing motion blurring in digital radiography, the method comprising the following steps:
generating at least one temporally coded blurred image of at least one object from radiation generated by an X-Ray generator responsive to a coded pattern;
capturing the at least one temporally coded blurred image through at least one micromirror device; and
generating a de-blurred image from the at least one temporally coded blurred image by using the coded pattern and an estimate of a motion vector of the at least one object.

2. The method according to claim 1, which further comprises estimating the motion vector by using the at least one temporally coded blurred image, wherein a sum of intensity of the at least one temporally coded blurred image corresponds to an intensity of a total amount of light.

3. The method according to claim 2, which further comprises generating the at least one temporally coded blurred image by directing the light corresponding to the radiation transmitted by the object onto a plurality of cameras responsive to the coded pattern.

4. The method according to claim 3, which further comprises generating the de-blurred image by using a plurality of temporally coded blurred images.

5. The method according to claim 1, which further comprises carrying out the step of controlling the generated radiation by controlling a voltage of an electrode between a cathode and an anode of the X-ray generator responsive to the coded pattern.

6. The method according to claim 1, which further comprises carrying out the step of generating the at least one temporally coded blurred image by controlling a current supplied to the X-ray generator responsive to the coded pattern.

7. A digital radiography system, comprising:
an imaging module for capturing at least one temporally coded blurred image of an object generated by using a coded pattern, wherein the imaging module includes at least one digital micromirror device that selectively toggles on and off responsive to the coded pattern; and
a processing module executing an algorithm stored in a non-transitory memory internal to the processing module or external to, but operably coupled to, the processing module for generating a de-blurred image from the at least one temporally coded blurred image by using the coded pattern and an estimate of motion of the object;
the at least one temporally coded blurred image being captured by using a total amount of generated light corresponding to at least a portion of radiation transmitted by the object.

8. The system according to claim 7, wherein said processing module estimates a motion vector by using the at least one temporally coded blurred image, and a sum of intensity of the at least one temporally coded blurred image corresponds to an intensity of a total amount of light.

9. The system according to claim 7, wherein said imaging module includes a plurality of cameras for capturing a plurality of temporally coded blurred images.

10. The system according to claim 9, wherein the at least one digital micromirror device includes a plurality of mirrors for directing the light corresponding to the radiation transmitted by the object onto said plurality of cameras.

11. The system according to claim 9, wherein said processing module generates the de-blurred image by using the plurality of temporally coded blurred images.

12. The system according to claim 7, which further comprises:
an X-ray generator configured to generate radiation; and
a controller operably coupled to said X-ray generator and controlling the radiation generated by said X-ray generator responsive to the coded pattern for generating the at least one coded blurred image.

13. The system according to claim 12, wherein:
said X-ray generator includes a cathode, an anode and an electrode disposed between said cathode and said anode;
said controller controls voltage of said electrode responsive to the coded pattern.

14. The system according to claim 12, wherein said controller controls a current supplied to said X-ray generator responsive to the coded pattern.

* * * * *